US009185032B2

(12) United States Patent
Nakakuki

(10) Patent No.: US 9,185,032 B2
(45) Date of Patent: Nov. 10, 2015

(54) RADIO APPARATUS THAT RECEIVES PACKET SIGNAL CONTAINING PREDETERMINED INFORMATION

(71) Applicant: SANYO ELECTRIC CO., LTD., Moriguchi-shi, Osaka (JP)

(72) Inventor: Toshio Nakakuki, Mizuho (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 183 days.

(21) Appl. No.: 13/768,763

(22) Filed: Feb. 15, 2013

(65) Prior Publication Data

US 2013/0223303 A1 Aug. 29, 2013

Related U.S. Application Data

(63) Continuation of application No. PCT/JP2011/007177, filed on Dec. 21, 2011.

(30) Foreign Application Priority Data

Dec. 28, 2010 (JP) .................. 2010-293562

(51) Int. Cl.
  *G08G 1/09* (2006.01)
  *G08G 1/16* (2006.01)
  *H04L 12/721* (2013.01)
  (Continued)

(52) U.S. Cl.
  CPC ............... *H04L 45/70* (2013.01); *G08G 1/094* (2013.01); *G08G 1/161* (2013.01); *G08G 1/164* (2013.01); *H04W 52/0232* (2013.01); *G08G 1/16* (2013.01); *H04W 4/02* (2013.01); *H04W 4/06* (2013.01)

(58) Field of Classification Search
  CPC .............................. H04L 45/70; H04B 1/3822
  See application file for complete search history.

(56) References Cited

U.S. PATENT DOCUMENTS 4,939,724 A * 7/1990 Ebersole ................. 370/407
4,941,089 A * 7/1990 Fischer ................... 709/231
(Continued)

FOREIGN PATENT DOCUMENTS

| CN | 101297505 A | 10/2008 |
|---|---|---|
| CN | 101751743 A | 6/2010 |

(Continued)

OTHER PUBLICATIONS

International Search Report issued in Int'l Application No. PCT/JP2011/007177 dated Mar. 19, 2012.

(Continued)

*Primary Examiner* — John Pezzlo
*Assistant Examiner* — William Johnson
(74) *Attorney, Agent, or Firm* — McDermott Will & Emery LLP

(57) ABSTRACT

An RF unit, a modem unit and a processing unit receive packet signals sent from other radio apparatuses and broadcast packet signals. If no packet signals are received over a predetermined period of time, a timing control unit has the RF unit, the modem unit and the processing unit perform an intermittent receiving processing and has them stop broadcasting the packet signals. When the packet signals are received while no packet signals has been received over the predetermined period of time, the timing control unit has them perform continuous receiving processing and has them start broadcasting the packet signals.

8 Claims, 12 Drawing Sheets

(51) Int. Cl.
  *H04W 52/02* (2009.01)
  *G08G 1/097* (2006.01)
  *H04W 4/02* (2009.01)
  *H04W 4/06* (2009.01)

(56) References Cited

U.S. PATENT DOCUMENTS

| | | | | |
|---|---|---|---|---|
| 4,969,205 | A * | 11/1990 | Itoh | 455/462 |
| 5,596,574 | A * | 1/1997 | Perlman et al. | 370/389 |
| 7,106,219 | B2 * | 9/2006 | Pearce | 340/995.13 |
| 7,483,413 | B2 * | 1/2009 | Strutt et al. | 370/338 |
| 8,130,685 | B2 | 3/2012 | Ishii et al. | |
| 8,305,209 | B2 | 11/2012 | Morita et al. | |
| 8,514,727 | B2 | 8/2013 | Ishii et al. | |
| 2004/0199664 | A1 * | 10/2004 | Feldman et al. | 709/238 |
| 2004/0215373 | A1 * | 10/2004 | Won et al. | 701/1 |
| 2004/0218620 | A1 * | 11/2004 | Palm et al. | 370/445 |
| 2006/0088042 | A1 * | 4/2006 | Shoham et al. | 370/401 |
| 2007/0168332 | A1 * | 7/2007 | Bussard et al. | 707/3 |
| 2007/0177594 | A1 * | 8/2007 | Kompella | 370/390 |
| 2008/0130592 | A1 * | 6/2008 | Lee et al. | 370/336 |
| 2009/0041000 | A1 * | 2/2009 | Obuchi et al. | 370/345 |
| 2009/0180414 | A1 * | 7/2009 | Maeda et al. | 370/311 |
| 2009/0196256 | A1 * | 8/2009 | DiGirolamo et al. | 370/331 |
| 2009/0201850 | A1 * | 8/2009 | Davis et al. | 370/328 |
| 2010/0067533 | A1 * | 3/2010 | Yoshida et al. | 370/401 |
| 2010/0098095 | A1 * | 4/2010 | Kato et al. | 370/401 |
| 2013/0301506 | A1 | 11/2013 | Ishii et al. | |

FOREIGN PATENT DOCUMENTS

| | | |
|---|---|---|
| JP | 2004-220143 A | 8/2004 |
| JP | 2005-202913 A | 7/2005 |
| JP | 2007-258811 A | 10/2007 |
| JP | 2010-258551 A | 11/2010 |
| WO | 2009140180 A1 | 11/2009 |

OTHER PUBLICATIONS

English translation of Search Report dated Feb. 10, 2015 issued Chinese Patent Application No. 201180039359.

* cited by examiner

FIG.3A

| FIRST SUBFRAME | SECOND SUBFRAME | THIRD SUBFRAME | N-TH SUBFRAME |

FIG.3B

| ROAD-TO-VEHICLE TRANSMISSION PERIOD | INTER-VEHICULAR TRANSMISSION PERIOD | INTER-VEHICULAR TRANSMISSION PERIOD | INTER-VEHICULAR TRANSMISSION PERIOD | INTER-VEHICULAR TRANSMISSION PERIOD |

FIG.3C

| INTER-VEHICULAR TRANSMISSION PERIOD | ROAD-TO-VEHICLE TRANSMISSION PERIOD | INTER-VEHICULAR TRANSMISSION PERIOD | INTER-VEHICULAR TRANSMISSION PERIOD | INTER-VEHICULAR TRANSMISSION PERIOD |

FIG.3D

| INTER-VEHICULAR TRANSMISSION PERIOD | INTER-VEHICULAR TRANSMISSION PERIOD | ROAD-TO-VEHICLE TRANSMISSION PERIOD | INTER-VEHICULAR TRANSMISSION PERIOD | INTER-VEHICULAR TRANSMISSION PERIOD |

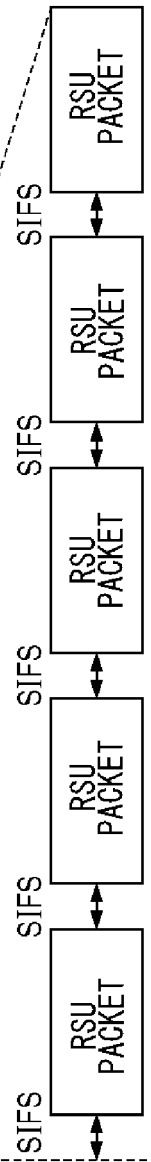
FIG.4A
FIG.4B

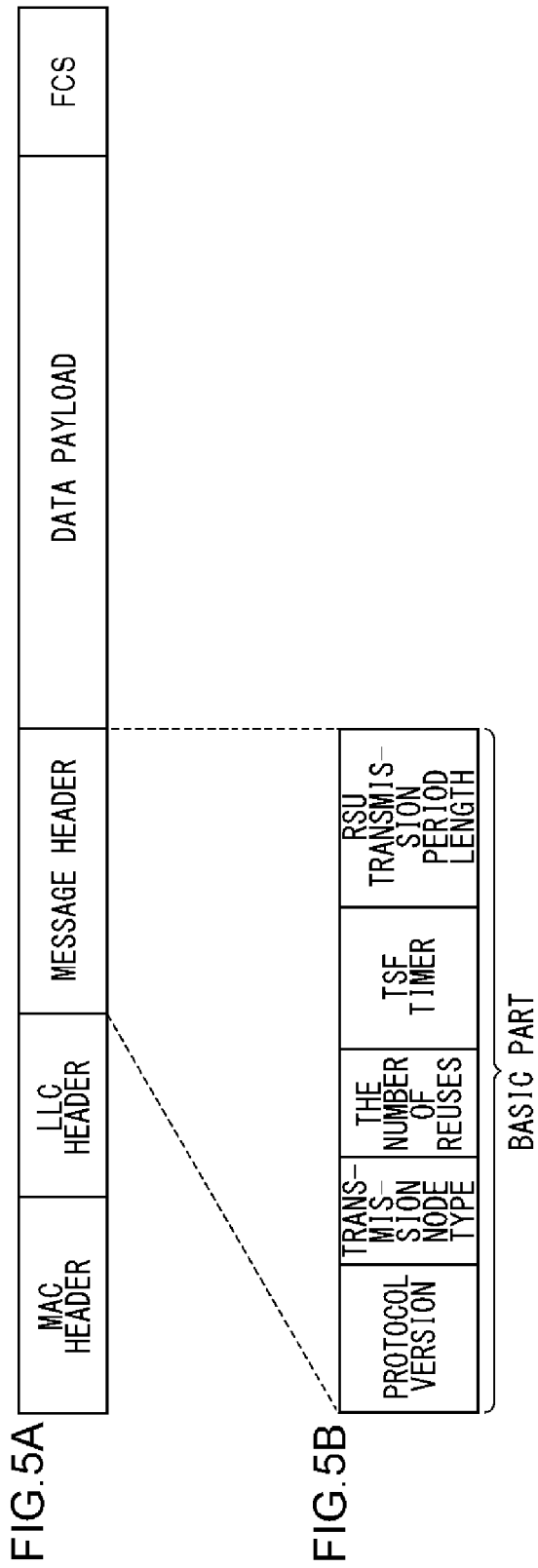

RADIO APPARATUS THAT RECEIVES PACKET SIGNAL CONTAINING PREDETERMINED INFORMATION

CROSS REFERENCE TO RELATED APPLICATIONS

This application is a Continuation of PCT/JP2011/007177, filed on Dec. 21, 2011, which claims priority of Japanese Patent Application No. 2010-293562, filed on Dec. 28, 2010, the disclosures of which applications are incorporated herein by reference.

BACKGROUND OF THE INVENTION

1. Field of the Invention

The present invention relates to a communication technology, and it particularly relates to a radio apparatus that receives a packet signal containing predetermined information.

2. Description of the Related Art

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit. Such a road-to-vehicle communication requires installation of roadside units, which means a great cost of time and money. In contrast to this, an inter-vehicular communication, in which information is communicated between in-vehicle units, has no need for installation of roadside units. In that case, current position information is detected in real time by GPS (Global Positioning System) or the like and the position information is exchanged between the in-vehicle units. Thus it is determined on which of the roads leading to the intersection the driver's vehicle and the other vehicles are located. Also, pedestrians carry radio apparatuses to prevent collision accidents between vehicles and pedestrians. Further, the degree of risk is determined from the GPS information on the pedestrians and the vehicles and then the pedestrians and the drivers are informed of the thus determined degree of risk.

It is also desired that not only the collision accidents of vehicles but also the collision accidents between vehicles and pedestrians be prevented. In order to prevent the collision accidents of vehicles, the collision of packet signals between the inter-vehicular communication and the road-to-vehicle communication needs to be suppressed. At the same time, in order to prevent the collision accidents between vehicles and pedestrians, a radio apparatus is carried by a pedestrian, who is an elementary school child, for instance. Since the radio apparatus carried by a pedestrian is battery-powered, the presence of the pedestrian cannot be conveyed to a driver if the remaining battery level gets low.

SUMMARY OF THE INVENTION

The present invention has been made in view of the foregoing circumstances, and a purpose thereof is to provide a technology for reducing the probability of collision with packet signals and reducing the power consumption.

In order to resolve the above-described problems, a radio apparatus according to one embodiment of the present invention includes: a receiving unit configured to receive a packet signal broadcasted from another radio apparatus; a broadcasting unit configured to broadcast a packet signal; and a control unit configured to have the receiving unit perform an intermittent receiving processing and configured to have the broadcasting unit stop broadcasting the packet signal, when no packet signals is received by the receiving unit over a predetermined period of time.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3D each shows a format of frame specified in the communication system of FIG. 1;

FIGS. 4A and 4B each shows a construction of subframe of FIGS. 3A to 3D;

FIGS. 5A and 5B each shows a format of MAC frame stored in a packet signal defined in the communication system of FIG. 1;

DETAILED DESCRIPTION OF THE INVENTION

Figure 1:
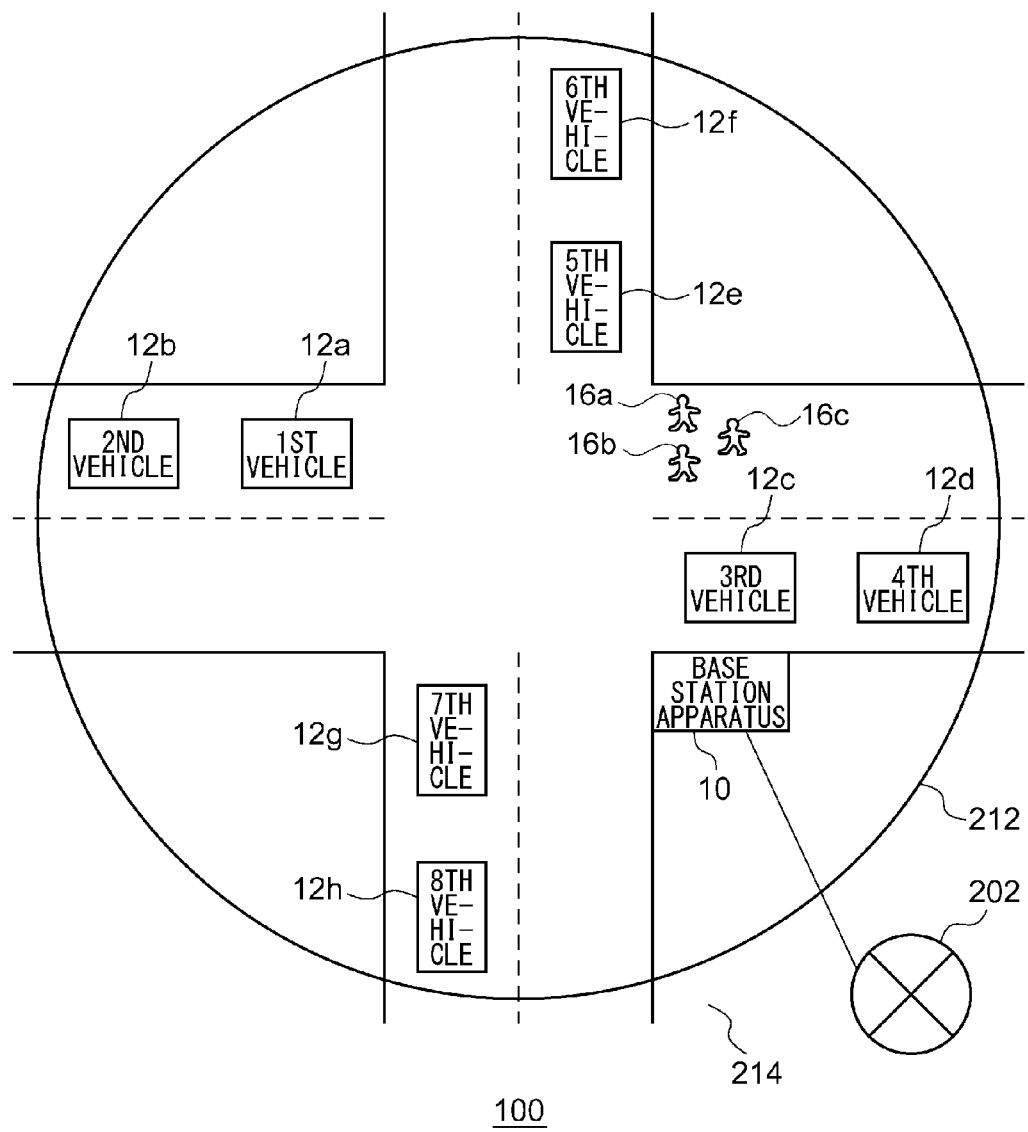
FIG. 1 shows a structure of a communication system according to an exemplary embodiment of the present invention.

The invention will now be described by reference to the preferred embodiments. This does not intend to limit the scope of the present invention, but to exemplify the invention.

Our knowledge underlying the present invention will be explained before exemplary embodiments of the present invention are explained in detail. An access control function called CSMA/CA (Carrier-Sense Multiple Access with Collision Avoidance) is used in wireless LAN (Local Area Network) compliant with IEEE 802.11 and the like. Thus, the same radio channel is shared by a plurality of terminal apparatuses. In such a scheme as CSMA, a packet signal is transmitted after it has been verified by carrier sense that other packet signals are not transmitted. When wireless LAN is applied to the inter-vehicular communication such as an intelligent transport system (ITS), a need arises to transmit information to a large indefinite number of terminal apparatuses, and therefore it is desirable that signals be sent by broadcast. As a result, the terminal apparatus detects the approach of other vehicles by the broadcast signals and thereby alerts the driver to prevent collision between the vehicles.

To convey the information sent via a network, such as information concerning traffic jam, to the driver, the execution of the road-to-vehicle communication is desired in addition to the inter-vehicular communication. Further, not only the prevention of collision accidents of vehicles but also the prevention of collision accidents between pedestrians and vehicles is desired. In order to prevent the collision accidents of vehicles, the collision of packet signals between the inter-vehicular communication and the road-to-vehicle communication needs to be suppressed. At the same time, in order to prevent the collision accidents between vehicles and pedestrians, a radio apparatus is carried by a pedestrian, who is an elementary school child, for instance.

Exemplary embodiments of the present invention relate to a communication system that carries out not only an inter-vehicular communication between terminal apparatuses mounted on vehicles but also a road-to-vehicle communication from a base station apparatus installed in an intersection and the like to the terminal apparatuses. Note that the terminal apparatus may be mounted on a vehicle or may be carried by a pedestrian. Accordingly, the following description there are cases where the inter-vehicular communication and the road-to-vehicle communication in the following description may assume that a pedestrian carries the terminal apparatus. Further, a terminal apparatus mounted on a vehicle is called an "on-vehicle terminal apparatus" or a "terminal apparatus for use in a vehicle", and a terminal apparatus carried or worn by a pedestrian is called a "mobile terminal apparatus" or "portable terminal apparatus". Hereinafter, the on-vehicle terminal apparatus and the mobile terminal apparatus will be generically referred to as "terminal apparatus". As the inter-vehicular communication, a terminal apparatus transmits, by broadcast, a packet signal in which the information (hereinafter referred to as "data" also) such as the traveling speed and position of a vehicle or pedestrian is stored. Another terminal apparatus receives a packet signal and also recognizes the approach and the like of a vehicle based on the data. Conveying the approach of the vehicle or pedestrian to the driver alerts the driver.

In order to reduce the interference between the inter-vehicular communication and the road-to-vehicle communication, the base station apparatus repeatedly specifies a frame that contains a plurality of subframes. To perform the road-to-vehicle communication, the base station apparatus selects any of a plurality of subframes and transmits, by broadcast, a packet signal that contains control information and the like, in a period of a beginning part of the selected subframe. The control information contains information regarding a time length required for the transmission of the packet signal by broadcast from the base station apparatus (hereinafter this time length will be referred to as "road-to-vehicle transmission period"). The terminal apparatus identifies the road-to-vehicle period based on the control information. The on-vehicle terminal apparatus transmits, by broadcast, packet signals using a CSMA scheme in a period, other than the road-to-vehicle transmission period, during which the inter-vehicular communication is performed (hereinafter this period will be referred to as "inter-vehicular transmission period"). Since in this manner the road-to-vehicle communication and the inter-vehicular communication are subjected to time-division multiplexing, the collision probability of packet signals in between the road-to-vehicle communication and the inter-vehicular communication is reduced.

Where a pedestrian carries a terminal apparatus with him/her, the traffic volume or traffic intensity may increase and the remaining battery of the battery-driven terminal may be depleted as already mentioned. In order to suppress the traffic volume and reduce the power consumption, a mobile terminal apparatus according to the present exemplary embodiment performs the following processing. That is, if no packets signal is received over a predetermined period of time (such a situation as this will be hereinafter referred to as "initial condition"), the mobile terminal apparatus will stop the transmission of packet signals by broadcast and, at the same time, perform an intermittent receiving processing. As a mobile terminal apparatus receives packet signals under the initial condition, this mobile terminal apparatus and the other mobile terminal apparatuses, which are presently located around this mobile terminal apparatus, form a group (hereinafter referred to as "group communication condition"). Under the group communication condition, a mobile terminal apparatus that is assigned to transmitting packet signals by broadcast is changed in turn among a plurality of mobile terminal apparatuses included in the thus formed group.

FIG. 1 shows a structure of a communication system 100 according to an exemplary embodiment of the present invention. FIG. 1 corresponds to a case thereof at an intersection viewed from above. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12", and a network 202. Also, there are a first pedestrian 16a, a second pedestrian 16b, and a third pedestrian 16c, who are generically referred to as "pedestrian 16" or "pedestrians 16". A not-shown on-vehicle terminal apparatus is mounted on each vehicle 12, and each pedestrian carries or wears a not-shown portable terminal apparatus with or on himself/herself. An area 212 is formed around the base station apparatus 10, and an almost-unreachable area 214 is formed outside the area 212.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

In the communication system 100, the base station apparatus 10 is installed at the intersection. The base station apparatus 10 repeatedly generates a frame containing a plurality of subframes, based on the signal received from not-shown GPS satellites and frames formed by the other base station apparatuses 10 (not-shown). Here, a definition is made such that the road-to-vehicle transmission period can be set to the leading part (beginning part) of each subframe. The base station apparatus 10 selects a subframe, in which the road-to-vehicle transmission period is not set by the other base station apparatuses 10, from among a plurality of subframes. The base station apparatus 10 sets the road-to-vehicle transmission period to the beginning part of the selected subframe. The base station apparatus 10 broadcasts the packet signal in the thus set road-to-vehicle transmission period. The packet signal contains control information.

A terminal apparatus produces a frame based on the control information contained in the received packet signal. As a result, frames generated respectively by a plurality of terminal apparatuses are synchronized with a frame generated by the base station apparatus 10. The terminal apparatus stores information regarding the present location in the packet signal, for instance. The terminal apparatus also stores the control information in the packet signal. That is, the control information transmitted from the base station apparatus 10 is transferred by the terminal apparatus. Here, the on-vehicle terminal apparatus executes CSMA/CA in the inter-vehicular transmission period so as to broadcast packet signals. The in-vehicle terminal, incapable of packet signals sent from the base station apparatus 10, which is namely located in the almost-unreachable area 214, executes CSMA/CA regardless of the frame construction and thereby broadcasts the packet signals. Further, the on-vehicle terminal apparatus receives packet signals from the other terminal apparatus and thereby conveys the approach of the vehicle or pedestrian to the driver.

The mobile terminal apparatus also executes CSMA/CA in the inter-vehicular transmission period so as to broadcast packet signals. In order to suppress the traffic volume and reduce the power consumption, the way the packet signals are broadcast by the mobile terminal apparatus differs from the way the packet signals are broadcast by the on-vehicle terminal apparatus in the following points. That is, the on-vehicle terminal apparatus broadcasts packet signals frame by frame and constantly performs the receiving processing. At the same time, the mobile terminal apparatus stops the broadcasting of packet signals and performs the intermittent receiving processing under the initial condition. For example, the mobile terminal apparatus performs the receiving processing on a frame of several frames. Under the group communication condition, the mobile terminal apparatus broadcasts packet signals in turn among the other mobile terminal apparatuses belonging to the same group and, at the same time, constantly performs the receiving processing. If, for example, the group is formed of three mobile terminal apparatuses, each mobile terminal apparatus will receive packet signals once every three frames. Here, a group is a cluster of mobile terminal apparatuses that are present in proximity to a degree such that packet signals can be transmitted and received among those belonging to the group.

Figure 2:
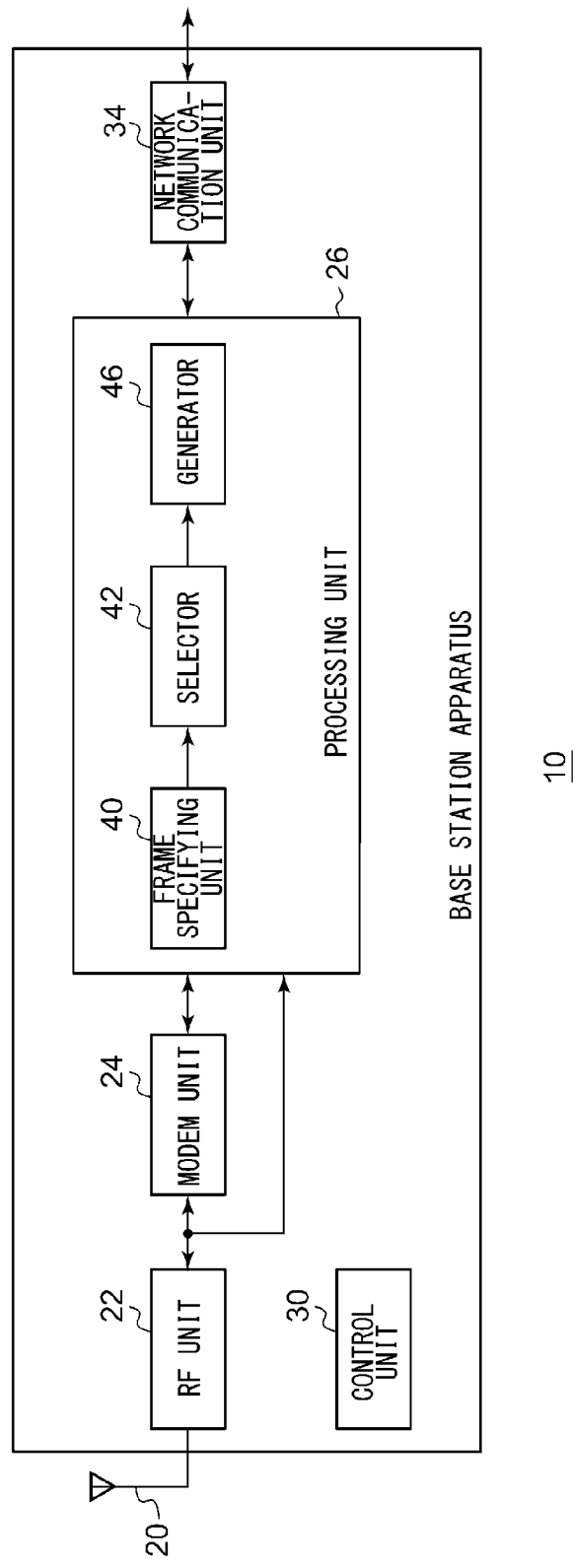
FIG. 2 shows a structure of a base station apparatus shown in FIG. 1.

FIG. 2 shows the base station apparatus 10. The base station apparatus 10 includes an antenna 20, an RF unit 22, a modem unit 24, a processing unit 26, a control unit 30, and a network communication unit 34. The processing unit 26 includes a frame specifying unit 40, a selector 42, and a generator 46. As a receiving processing, the RF unit 22 receives, through the antenna 20, packet signals transmitted from terminal apparatuses and the other base station apparatuses 10 (not shown). The RF unit 22 performs a frequency conversion on the received packet signal of a radiofrequency and thereby generates a packet signal of baseband. Further, the RF unit 22 outputs the baseband packet signal to the modem unit 24. Generally, a baseband packet signal is formed of an in-phase component and a quadrature component, and therefore it should be represented by two signal lines. However, it is represented by a single signal line here to make the illustration clearer for understanding. The RF unit 22 also includes an LNA (Low Noise Amplifier), a mixer, an AGC (Automatic Gain control) unit, and an A/D converter.

As a transmission processing, the RF unit 22 performs a frequency conversion on the baseband packet signal inputted from the modem unit 24 and thereby generates a radiofrequency packet signal. Further, the RF unit 22 transmits, through the antenna 20, the radiofrequency packet signal in a road-to-vehicle transmission period. The RF unit 22 also includes a PA (Power Amplifier), a mixer, and a D-A converter.

As a receiving processing, the modem unit 24 demodulates the radiofrequency packet signal fed from the RF unit 22. Further, the modem unit 24 outputs the demodulation result to the processing unit 26. As a transmission processing, the modem unit 24 modulates the data fed from the processing unit 26. Further, the modem unit 24 outputs the modulation result to the RF unit 22 as a baseband packet signal. It is to be noted here that the communication system 100 is compatible with the OFDM (Orthogonal Frequency Division Multiplexing) modulation scheme and therefore the modem unit 24 performs FFT (Fast Fourier Transform) as a receiving processing and performs IFFT (Inverse Fast Fourier Transform) as a transmission processing also.

The frame specifying unit 40 receives signals from the not-shown GPS satellites and acquires information on the time of day based on the received signals. It should be noted that known art can be used for the acquisition of information on the time of day and therefore the description thereof is omitted here. The frame specifying unit 40 generates a plurality of frames based on the information on the time of day. For example, the frame specifying unit 40 generates ten "100 msec" frames by dividing a duration of "1 sec" into 10 parts starting from the timing indicated by the information on the time of day. Frames are thus defined and specified repeatedly through the repetition of this process. Note that the frame specifying unit 40 may detect the control information from the demodulation result and generate frames based on the detected control information. Such a processing as this corresponds to generating a frame synchronized with the timing of the frames formed by the other base station apparatuses 10. FIGS. 3A to 3D each shows a format of frame specified in the communication system 100. FIG. 3A shows a construction of each frame. Each frame is formed of N subframes denoted by a first subframe to an Nth subframe. For example, when each frame is 100 msec long and N is 8, the subframe of 12.5 msec in length (duration) is defined. A description of FIGS. 3B to 3D will be given later. Now, refer back to FIG. 2.

The selector 42 selects a subframe, with which to set the road-to-vehicle transmission period, from among a plurality of subframes contained in a frame. More to the point, the selector 42 receives a frame defined by the frame specifying unit 40. The selector 42 receives the input of demodulation results from the not-shown other base station apparatuses 10 or other terminal apparatuses via the RF unit 22 and the modem unit 24. The selector 42 extracts the demodulation result sent from the other base station apparatuses 10 from among the demodulation results inputted. The selector 42 identifies a subframe, which does not receive the demodulation result, by identifying the subframe that has received the demodulation result. This corresponds to identifying an unused subframe, namely, a subframe to which the road-to-vehicle transmission period is not set by the other base station apparatuses 10. If there are a plurality of unused subframes, the selector 42 will randomly select a single subframe. If there is no unused subframes, namely, if a plurality of subframes are all used respectively, the selector 42 will acquire the received power corresponding to the demodulation result and select preferentially a subframe whose received power is small.

FIG. 3B shows a construction of a frame generated by a first base station apparatus 10a. The first base station apparatus 10a sets a road-to-vehicle transmission period at the beginning of the first subframe. Subsequent to this road-to-vehicle transmission period, the first base station apparatus 10a sets an inter-vehicular transmission period in the first subframe. The inter-vehicular transmission period is a period during which a terminal apparatus can broadcast a packet signal. In other words, the subframes are defined such that the first base station apparatus 10a can broadcast the packet signal in the road-to-vehicle transmission period assigned to the beginning of the first subframe and such that the terminal apparatus can broadcast the packet signal in the inter-vehicular transmission period, other than the road-to-vehicle transmission period, in each frame. Further, the first base station apparatus 10a sets only the inter-vehicular periods to the second to Nth subframes.

FIG. 3C shows a construction of a frame generated by a second base station apparatus 10b. The second base station apparatus 10b sets a road-to-vehicle transmission period at the beginning of the second subframe. The second base station apparatus 10b sets an inter-vehicular transmission period to the subsequent remaining period of the second subframe, and sets only the inter-vehicular frames to the first subframe, the third to Nth subframes. FIG. 3D shows a construction of a frame generated by a third base station apparatus 10c. The third base station apparatus 10c sets a road-to-vehicle transmission period at the beginning of the third subframe. The third base station apparatus 10c sets an inter-vehicular transmission period to the subsequent remaining period of the third subframe, and sets only the inter-vehicular frames to the first and second subframes and the fourth to Nth subframes. In this manner, a plurality of base station apparatuses 10 select mutually different subframes and set the road-to-vehicle transmission periods at the beginnings of the selected subframes, respectively. Now, refer back to FIG. 2. The selector 42 outputs the number of the selected subframes to the detector 44 and the generator 46.

The generator 46 sets the road-to-vehicle transmission period to the subframe that corresponds to the received subframe number, and generates RSU packet signals to be broadcast in the road-to-vehicle transmission period. Note that in the following description, "RSU packet signal" and "packet signal" will be used such that no distinction is made therebetween. FIGS. 4A and 4B each shows a construction of subframe. FIG. 4A shows a subframe where the road-to-vehicle period has been set. As shown in FIG. 4A, each subframe is comprised of a road-to-vehicle transmission period and an inter-vehicular transmission period in this order. As shown in FIG. 4B, a plurality of RSU packet signals are arranged in the road-to-vehicle transmission period. It should be noted here that the previous and next packet signals are separated by a short interframe space (SIFS).

A description is given here of a construction of RSU packet signal. FIGS. 5A and 5B each shows a format of MAC frame stored in a packet signal defined in the communication system 100. FIG. 5A shows a format of MAC frame. The MAC frame is such that "MAC header", "LLC header", "message header", "data payload", and "FCS" are assigned in this order starting from the beginning. Information contained in the data payload will be discussed later. FIG. 5B is a diagram showing a construction of message header generated by the generator 46. The message header includes a basic part.

The basic part includes "protocol version", "transmission node type", "the number of reuses", "TSF timer", and "RSU transmission period length". The protocol version indicates a version of compatible protocol. The transmission node type indicates a sender of packet signal that contains the MAC frame. For example, one of the base station apparatus 10, the on-vehicle terminal apparatus, and the mobile terminal apparatus is indicated in the transmission node type. If the mobile terminal apparatus is indicated, this will correspond to indicating that the terminal apparatus is not mounted on the vehicle 12 and the terminal apparatus is carried by the pedestrian 16. When the selector 42 extracts the demodulation results sent from the other base station apparatuses 10 from the inputted demodulation results, the selector 42 utilizes the value of the transmission node type. The number of reuses indicates an index of validity in the case when the header message is transferred by the terminal apparatus. TSF timer indicates the transmission time. The RSU transmission period length indicates the time length of road-to-vehicle transmission period and therefore the RSU transmission period is said to serve as the information regarding the road-to-vehicle transmission period. Refer back to FIG. 2.

The network communication unit 34 connects to the not-shown network 202. The network communication unit 34 receives the traffic jam information and road repairing information from the network 202. The generator 46 acquires the traffic jam information and the road repairing information from the network communication unit 34 and then stores them in the data payload, which in turn generates the aforementioned RSU packet signal. Note that the positional information on the intersection at which the base station apparatus 10 is installed (hereinafter referred to as "intersection positional information" also) may also be included in the data payload. The intersection positional information may be said to be the positional information on the base station apparatus 10. The control unit 30 controls the entire processing of the base station apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only or a combination of hardware and software.

Figure 6:
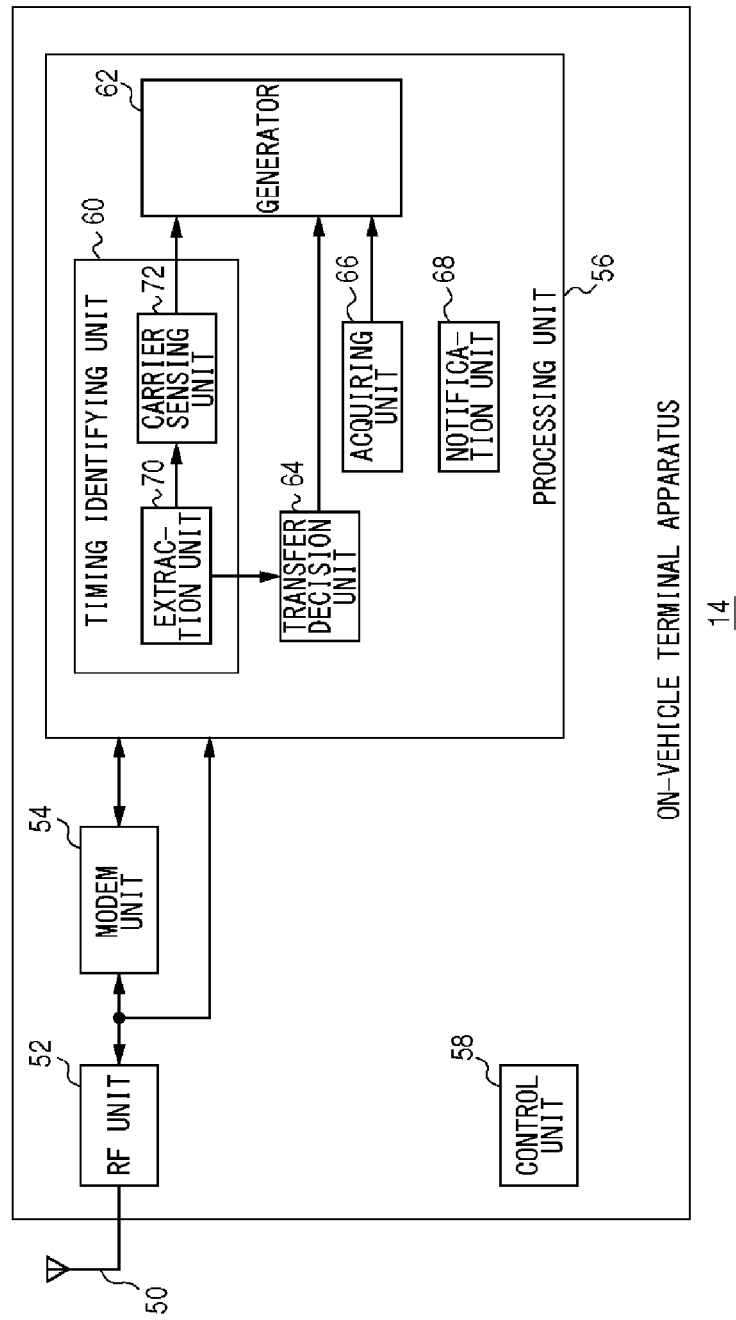
FIG. 6 shows a structure of an on-vehicle terminal apparatus mounted on a vehicle shown in FIG. 1.

FIG. 6 shows a structure of an on-vehicle terminal apparatus 14 mounted on a vehicle 12. The on-vehicle terminal apparatus 14 includes an antenna 50, an RF unit 52, a modem unit 54, a processing unit 56, and a control unit 58. The processing unit 56 includes a timing identifying unit 60, a generator 62, a transfer decision unit 64, an acquiring unit 66, and a notification unit 68. The timing identifying unit 60 includes an extraction unit 70 and a carrier sensing unit 72. The antenna 50, the RF unit 52, and the modem unit 54 perform the processings similar to those of the antenna 20, the RF unit 22, and the modem unit 24 of FIG. 2, respectively. A description is therefore given here centering around features different from those of FIG. 2.

The modem unit 54 and the processing unit 56 receive the packet signals sent from not-shown other on-vehicle terminal apparatuses 14, not-shown other portable terminal apparatuses and not-shown base station apparatus 10. As described earlier, the modem unit 54 and the processing unit 56 receive the packet signal, sent from the base station apparatus 10, in the road-to-vehicle transmission period. And the modem unit 54 and the processing unit 56 receive the packet signal, sent from the not-shown other on-vehicle terminal apparatuses 14 and the not-shown other portable terminal apparatuses, in the inter-vehicular transmission period.

When the demodulation result from the modem unit 54 relates to the packet signal sent from the not-shown base station apparatus 10, the extraction unit 70 identifies the timing of a subframe assigned to the road-to-vehicle transmission period. In so doing, the extraction unit 70 estimates that the terminal apparatus is located within the area 212 of FIG.

1. Frames are generated based on the timing of the subframe and a content of the message header of the packet signal (more specifically, the information on the RSU transmission period length). Since the frames may be generated similarly to the aforementioned frame specifying unit 40, the repeated description thereof is omitted here. As a result, the extraction unit 70 generates a frame synchronized with the timing of the frame formed by the base station apparatus 10.

If, on the other hand, no RSU packet signals is received, the extraction unit 70 will estimate that the terminal apparatus is located in the almost-unreachable area 214. If it is estimated to be located in the almost-unreachable area 214, the extraction unit 70 will select the timing unrelated to the frame construction. If the inter-vehicular transmission period is selected, the extraction unit 70 will output the timings of frame and subframes and the information on the inter-vehicular transmission period to the carrier sensing unit 94. If the timing unrelated to the frame construction is selected, the extraction unit 70 will instruct the carrier sensing unit 72 to carry out carrier sensing.

The carrier sensing unit 72 receives the timing of frame and subframes and the information on the inter-vehicular transmission period. The carrier sensing unit 72 measures an interference power by performing carrier sensing in the inter-vehicular transmission period. Also, the carrier sensing unit 72 determines the transmission timing in the inter-vehicular transmission period, based on the interference power measured. More specifically, the carrier sensing unit 72 stores beforehand a predetermined threshold value and compares the interference power against the threshold value. If the interference power is smaller than the threshold value, the carrier sensing unit 72 will determine the transmission timing. If the execution of carrier sensing is instructed from the extraction unit 70, the carrier sensing unit 72 will execute CSMA without regard to the frame construction and thereby determine the transmission timing. The carrier sensing unit 72 conveys the thus determined transmission timing to the generator 62.

The acquiring unit 66 includes a GPS receiver, a gyroscope, a vehicle speed sensor, and so forth all of which are not shown. The acquiring unit 66 acquires the present position, traveling direction, traveling speed and so forth of a not-shown vehicle 12, namely the vehicle 12 carrying the on-vehicle terminal apparatus 14, based on data supplied from the aforementioned not-shown components of the acquiring unit 66. (Hereinafter the present position, traveling direction, traveling speed and so forth will be generically referred to as "positional information" or "position information".) The present position thereof is indicated by the latitude and longitude. Known art may be employed to acquire them and therefore the description thereof is omitted here. The acquiring unit 66 outputs the positional information to the generator 62.

The transfer decision unit 64 controls the transfer of the message headers. The transfer decision unit 64 extracts a message header from the packet signal. Where the packet signal is directly sent from the base station apparatus 10, the number of reuses is set to "0". If the packet signal is sent from the other on-vehicle terminal apparatuses 14 and portable terminal apparatuses, the number of reuses will be set to "one or more". The transfer decision unit 64 extract a message header to be transferred, from the extracted message headers. For example, a message header whose number of reuses is the minimum is selected. Also, the transfer decision unit 64 may generate a new message header by combining the contents contained in a plurality of message headers. The transfer decision unit 64 outputs the message header to be selected, to the generator 62. In so doing, the transfer decision unit 64 increases the number of reuses by "1".

The generator 62 receives the positional information from the acquiring unit 66 and receives the message header sent from the transfer decision unit 64. The generator 62 uses the MAC frame shown in FIGS. 5A and 5B and stores the positional information in the data payload. The generator 62 generates a packet signal containing the MAC frame and transmits, by broadcast, the thus generated packet signal with the transmission timing determined by the carrier sensing unit 72, via the modem unit 54, the RF unit 52, and the antenna 50. Note that the transmission timing is included in the inter-vehicular transmission period.

The notification unit 68 acquires the packet signal sent from the not-shown base station apparatus 10 in the road-to-vehicle transmission period and also acquires the packet signals sent from the not-shown other on-vehicle terminal apparatuses 14 and mobile terminal apparatuses. As a process carried out for the acquired packet signal, the notification unit 68 conveys the approach or the like of the not-shown other vehicles 12 and pedestrians 16 to the driver via a monitor or speaker according to the content of the data stored in the packet signal. Also, the notification unit 68 conveys the traffic jam information and the road repairing information, extracted by the extraction unit 70, to the driver. If, for example, map information is displayed on a navigation device mounted on the vehicle 12, the notification unit 68 will display the presence and their locations of traffic jam and road repairing on the map. The notification unit 68 may output these items of information from the speaker. The control unit 58 controls the entire operation of the on-vehicle terminal apparatus 14.

Figure 7:
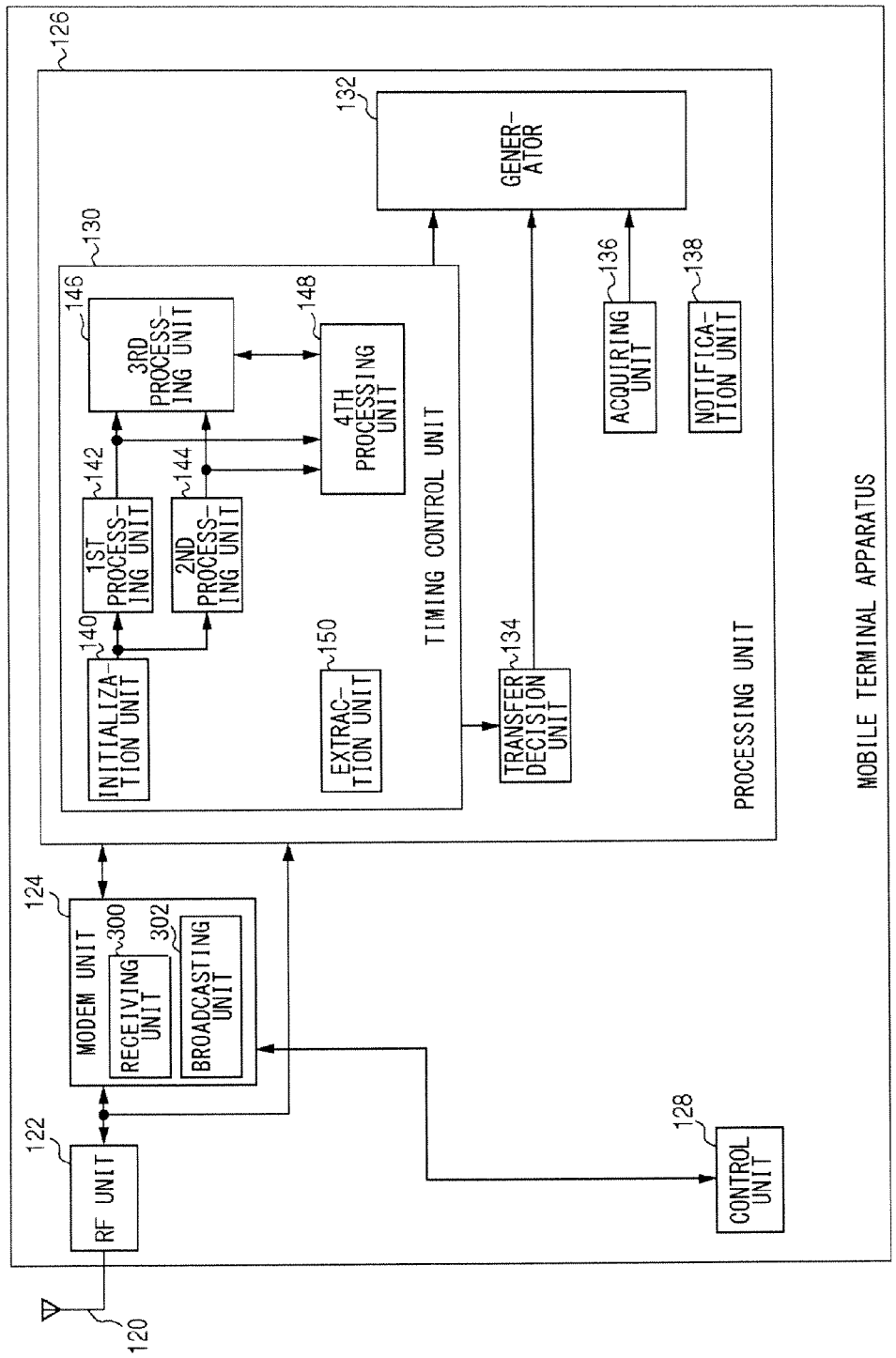
FIG. 7 shows a structure of a mobile terminal apparatus carried by a pedestrian shown in FIG. 1.

FIG. 7 shows a structure of a mobile terminal apparatus 110 carried by a pedestrian 16. The mobile terminal apparatus 110 includes an antenna 120, an RF unit 122, a modem unit 124, a processing unit 126, and a control unit 128. The processing unit 126 includes a timing control unit 130, a generator 132, a transfer decision unit 134, an acquiring unit 136, and a notification unit 138. The timing control unit 130 includes an initialization unit 140, a first processing unit 142, a second processing unit 144, a third processing unit 146, a fourth processing unit 148, and an extraction unit 150. The antenna 120, the RF unit 122, the modem unit 124, the extraction unit 150, the transfer decision unit 134, the acquiring unit 136, and the generator 132 perform the processings similar to those of the antenna 50, the RF unit 52, the modem unit 54, the extraction unit 70, the transfer decision unit 64, the acquiring unit 66, and the generator 62 of FIG. 6, respectively. A description is therefore given here centering around features different from those of FIG. 6.

If no packet signals is received for a predetermined period of time, namely, under the aforementioned initial condition, the initialization unit 140 will have the RF unit 122, the modem unit 124 and the processing unit 126 perform the intermittent receiving processing. In the intermittent receiving processing, the receiving processing is first carried out for a frame of 100 msec and then the receiving processing is stopped for the subsequent period of 900 msec, for instance. Such processing as this is called "initial processing". At an initial state, the initialization unit 140 has the RF unit 122, the modem unit 124 and the processing unit 126 stop the broadcasting of packet signals. As shown in FIGS. 5A and 5B, the received packet signal is constructed such that the message header and the data payload are assigned in this order and such that a data header contains the transmission node type. The transmission node type indicates any one of the base station apparatus 10, the on-vehicle terminal apparatus 14, and the mobile terminal apparatus 110. Thus, the transmission node type is said to be the information regarding the status of use of a radio apparatus that is the broadcasting source.

If a packet signal is received under the initial condition and if the transmission node type indicates the on-vehicle terminal apparatus 14, the initialization unit 140 will have the RF unit 122, the modem unit 124 and the processing unit 126 stop the receiving processing for the remaining part of the packet signal. The initialization unit 140 determines to make the transition from the initial condition to the group communication condition and conveys its decision to the first processing unit 142. If a packet signal is received under the initial condition and if the transmission node type indicates another mobile terminal apparatus 110, the initialization unit 140 will have the RF unit 122, the modem unit 124 and the processing unit 126 continue the receiving processing for the remaining part of the packet signal. The initialization unit 140 determines to make the transition from the initial condition to the group communication condition and conveys its decision to the second processing unit 144. Further, the initialization unit 140 has the second processing unit 144 acquire the result of the receiving processing for the remaining part of the packet signal.

If the transition to the group communication condition has been conveyed from the initialization unit 140, the first processing unit 142 has the RF unit 122, the modem unit 124 and the processing unit 126 perform continuous receiving processing and has them start broadcasting packet signals. More specifically, the first processing unit 142 generates a group ID anew. For example, the group ID is generated at random. The first processing unit 142 sets the number of members to "1". Here, "1" corresponds to the initial value. Note that the initial value may be any other value than "1". The first processing unit 142 instructs the generator 132 to generate and broadcast a packet signal where the information regarding the group ID and the number of members is contained in the data payload. Similar to the case of the on-vehicle terminal apparatus 14, the packet signals are broadcast in the inter-vehicular transmission period using the CSMA scheme. After these processings have been completed, the first processing unit 142 informs the third processing unit 146 and the fourth processing unit 148 accordingly.

If the transition to the group communication condition has been conveyed from the initialization unit 140, the second processing unit 144 has the RF unit 122, the modem unit 124 and the processing unit 126 perform continuous receiving processing and has them start broadcasting packet signals. More specifically, the second processing unit 144 extracts the information on the group ID and the number of members contained in the data payload of the packet signal. The second processing unit 144 keeps the group ID. This corresponds to participating in a group formed by another mobile terminal apparatus 110. The second processing unit 144 adds "1" by incrementing the extracted number of members. The second processing unit 144 instructs the generator 132 to generate and broadcast a packet signal where the information regarding the group ID and the number of members is contained in the data payload. The packet signal is broadcast similarly to the case when the instruction is given from the first processing unit 142. After these processings have been completed, the second processing unit 144 informs the third processing unit 146 and the fourth processing unit 148 accordingly.

If the transmission node type indicates another mobile terminal apparatus when a packet signal is received after the notification, informing that the broadcasting of packet signals has been completed, is received from the first processing unit 142 or the second processing unit 144, the third processing unit 146 will verify the content of the payload. The third processing unit 146 checks the group ID contained in the data payload. If this group ID is identical to the group ID contained in the data payload of the packet signal that has already been broadcast upon instructions from the first processing unit 142 or the second processing unit 144, the third processing unit 146 will have the RF unit 122, the modem unit 124 and the processing unit 126 stop the broadcasting of packet signals. If, on the other hand, this group ID differs from the group ID contained in the data payload of the packet signal that has already been broadcast upon instructions from the first processing unit 142 or the second processing unit 144, the third processing unit 146 will perform the processing similar to that done by the second processing unit 144. Note that, in a period during which the group ID belonging to the same group is broadcast, the third processing unit 146 may acquire a group ID different from the group belonging to the same group or may have the RF unit 122, the modem unit 124 and the processing unit 126 stop broadcasting the packet signals. If a packet signal is received after this, the third processing unit 146 will perform the similar processing. The generator 46 conveys to the fourth processing unit 148 that the packet signal sent from another mobile terminal apparatus 110 has been received.

If the notification, informing that the broadcasting of packet signals has been completed, is received from the first processing unit 142 or the second processing unit 144 or if the notification, informing that a packet signal is received, is received from the third processing unit 146, the timer is returned to "0" to resume its counting. That is, the fourth processing unit 148 measures a time duration that has elapsed after the notification was received. If the value of the timer becomes larger than a threshold value, the fourth processing unit 148 will generate a new group ID different from the group ID contained in the data payload of the packet signal that has already been broadcast. This corresponds to the processing carried out when no packet signals is received over a predetermined period of time after the notification was received. The fourth processing unit 148 sets the number of members to "1".

Further, the fourth processing unit 148 instructs the generator 132 to generate a packet signal that contains the new group ID, information on the number of members "1", the group ID contained in the data payload of the packet signal that has already been broadcast (hereinafter referred to as "old group ID"), and information on the most recent number of members for the old ID in the data payload. After these processings have been completed, the fourth processing unit 148 informs the third processing unit 146 accordingly. Such a processing carried out by the fourth processing unit 148 corresponds to an autonomous update of group ID. On the other hand, the processing, in which the third processing unit 146 increments the number of members when the third processing unit 146 acquires a new group ID, corresponds to a forced update of group ID. If a packet signal in which the transmission node type indicates an on-vehicle terminal apparatus 14 is not received, the fourth processing unit 148 may instruct the initialization unit 140 to execute the initial processing.

Figure 8:
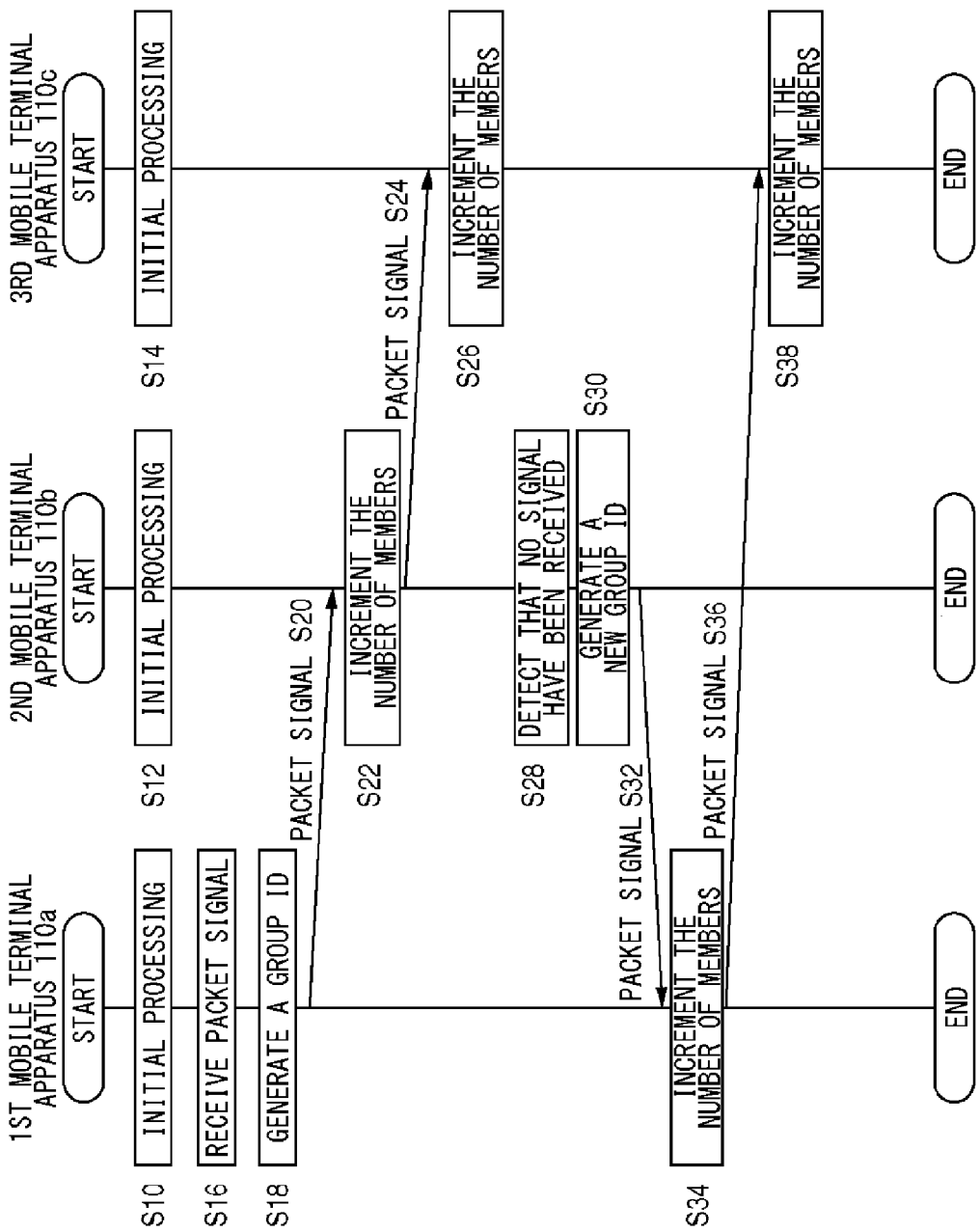
FIG. 8 is a sequence diagram showing a communication procedure in the communication system of FIG. 1.

An operation of the communication system 100 configured as above is now described. FIG. 8 is a sequence diagram showing a communication procedure in the communication system 100. The first mobile terminal apparatus 110a executes the initial processing (S10), the second mobile terminal apparatus 110b executes the initial processing (S12), and the third mobile terminal apparatus 110c executes the initial processing (S14). The first mobile terminal apparatus 110a receives a packet signal sent from the on-vehicle terminal apparatus 14 (S16). The first mobile terminal apparatus 110a generates a group ID (S18). The first mobile terminal apparatus 110a broadcasts the packet signal (S20). The second mobile terminal apparatus 110b increments the number of members (S20).

The second mobile terminal apparatus 110b broadcasts a packet signal (S24). The third mobile terminal apparatus 110c increments the number of members (S26). The second mobile terminal apparatus 110b detects that no packet signals is received over a predetermined period of time after the third mobile terminal apparatus 110c has broadcast the packet signal (S28). The second mobile terminal apparatus 110b generates a new group ID (S30). The second mobile terminal apparatus 110b broadcasts the packet signal (S32). The first mobile terminal apparatus 110a increments the number of members (S34). The first mobile terminal apparatus 110a broadcasts the packet signal (S36). The third mobile terminal apparatus 110c increments the number of members (S38).

Figure 9:
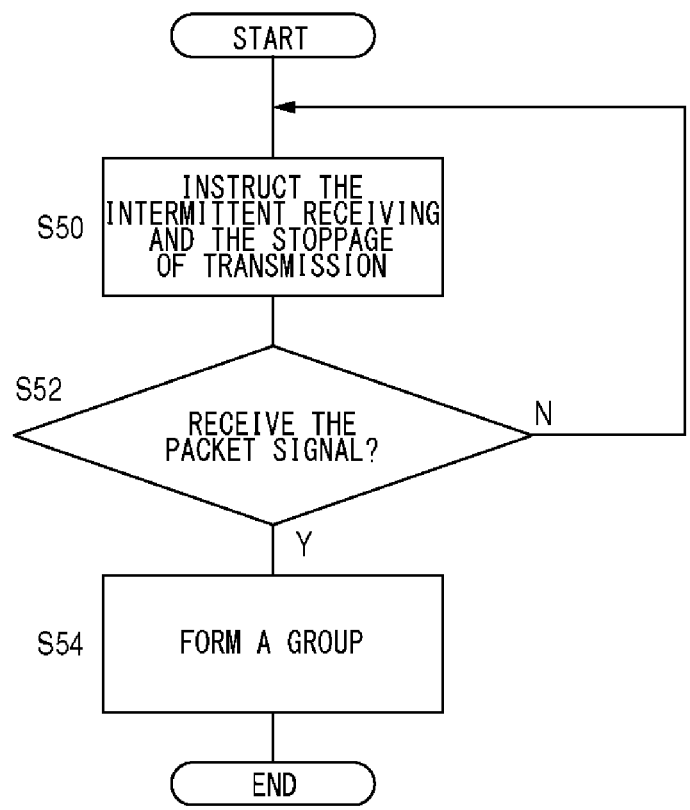
FIG. 9 is a flowchart showing a procedure, for making the transition to the formation of a group, performed by the mobile terminal apparatus of FIG. 7.

FIG. 9 is a flowchart showing a procedure, for making the transition to the formation of a group, performed by the mobile terminal apparatus 110. FIG. 9 corresponds to steps S10, S16, and S18 of FIG. 8. The initialization unit 140 instructs the RF unit 122, the modem unit 124 and the processing unit 126 to receive packet signals intermittently and stop the transmission of packet signals (S50). If the RF unit 122, the modem unit 124 and the processing unit 126 receive no packet signals sent from the terminal apparatuses (N of S52), the procedure will return to Step S50. If, on the other hand, the RF unit 122, the modem unit 124 and the processing unit 126 receive a packet signal sent from a terminal apparatus (Y of S52), the first processing unit 142 or the second processing unit 144 will form a group (S54).

Figure 10:
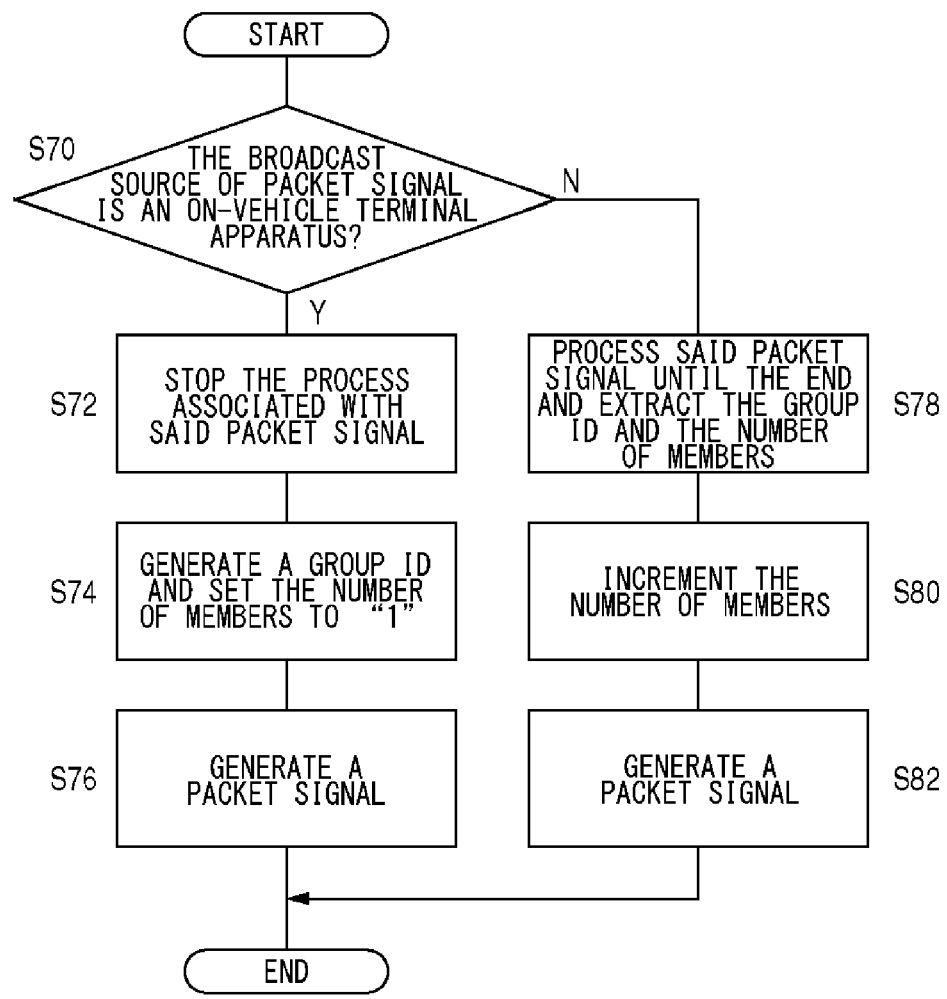
FIG. 10 is a flowchart showing a procedure, for forming an initial group, performed by the mobile terminal apparatus of FIG. 7.

FIG. 10 is a flowchart showing a procedure, for forming an initial group, performed by the mobile terminal apparatus 110. Steps S72-S76 of FIG. 10 correspond to step S18 of FIG. 8, and steps S78-S82 of FIG. 10 correspond to steps S22 and S26 of FIG. 8. If the broadcasting source of a packet signal is the on-vehicle terminal apparatus 14 (Y of S70), the initialization unit 140 will have the RF unit 122, the modem unit 124 and the processing unit 126 stop the processing performed on said packet signal (S72). The first processing unit 142 generates a group ID and sets the number of members to "1" (S74). The generator 132 generates a packet signal according to the instructions given from the first processing unit 142 (S76). If the broadcasting source of the packet signal is not the on-vehicle terminal apparatus 14 (N of S70), the second processing unit 144 will process said packet signal until the end and then extract the group ID and the number of members (S78). The second processing unit 144 increments the number of members (S80). The generator 132 generates a packet signal according to the instructions given from the second processing unit 144 (S82).

Figure 11:
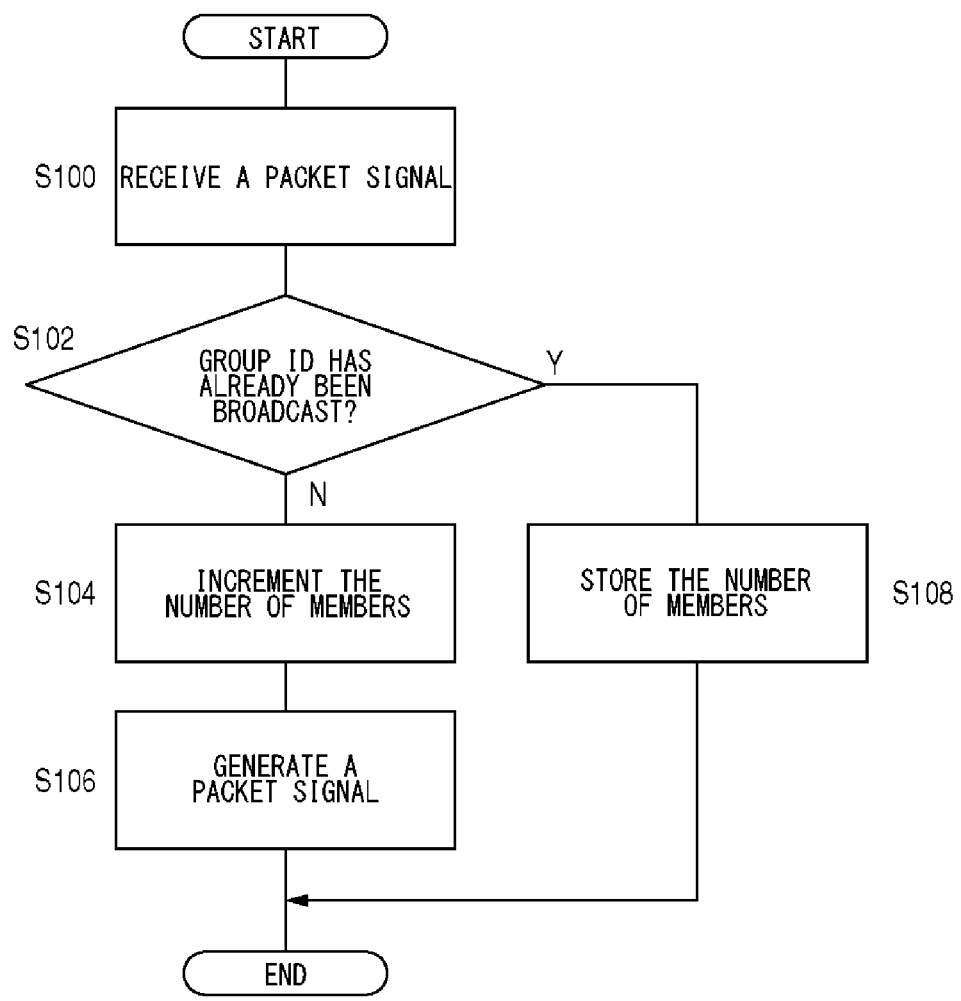
FIG. 11 is a flowchart showing a communication procedure within a group performed by the mobile terminal apparatus of FIG. 7.

FIG. 11 is a flowchart showing a communication procedure within a given group performed by the mobile terminal apparatus 110. FIG. 11 corresponds to steps S22 and S26 of FIG. 8. The RF unit 122, the modem unit 124 and the processing unit 126 receive a packet signal (S100). If the received packet signal does not contain the group ID that has already been broadcast (N of S102), the third processing unit 146 will increment the number of members (S104). The generator 132 generates a packet signal according to the instructions given from the third processing unit 146 (S106). If the received packet signal contains the group ID that has already been broadcast (Y of S102), the third processing unit 146 will store the number of members (S108).

Figure 12:
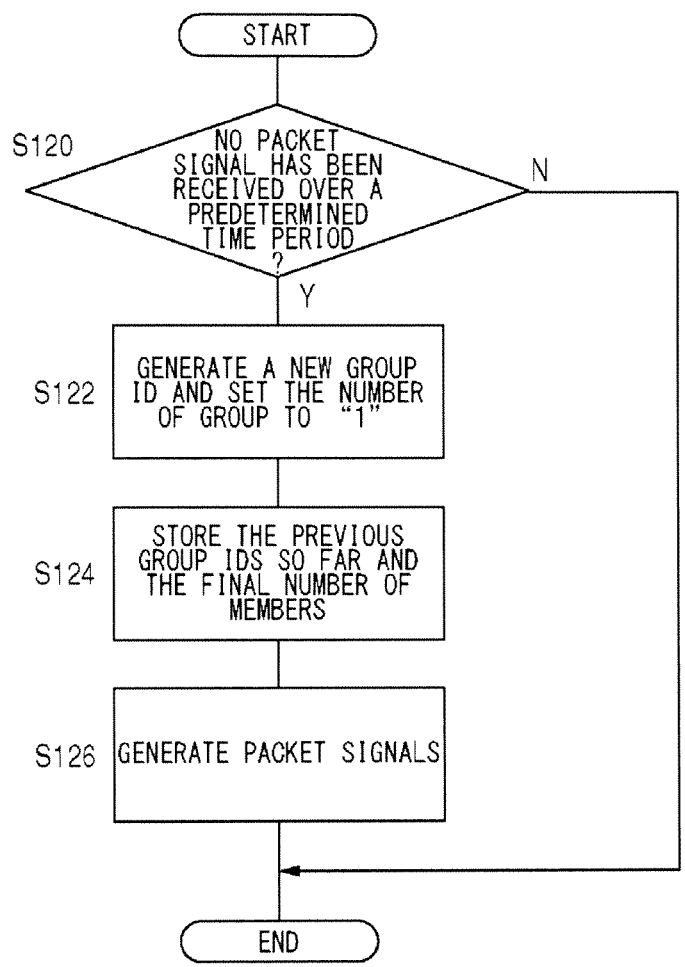
FIG. 12 is a flowchart showing a procedure, for continuing a group, performed by the mobile terminal apparatus of FIG. 7.

FIG. 12 is a flowchart showing a procedure, for continuing a group, performed by the mobile terminal apparatus 110. FIG. 12 corresponds to steps S28 and S30 of FIG. 8. If no packet signals is received over a predetermined period of time (Y of S120), the fourth processing unit 148 will generate a new group ID and set the number of members to "1" (S122). The fourth processing unit 148 stores the group IDs up to this point and the final number of members in the date payload (S124). The generator 132 generates a packet signal according to the instructions given from the fourth processing unit 148 (S126). If on the other hand, a packet signal is received (N of S120), Steps S122 to S126 will be skipped.

By employing the exemplary embodiments of the present invention, if no packet signals is received over a predetermined period of time, the intermittent receiving processing is carried out and, at the same time, the transmission of packet signals is stopped. Thus, the traffic volume can be reduced and the power consumption can be reduced. The continuous receiving processing is carried out when a packet is received, so that the probability of failing to receive packet signals can be reduced. Since the transmission starts when a packet signal is received, the presence of the sender of the packet signal can be conveyed to the surrounding terminal apparatuses. Since the presence thereof is conveyed to the surrounding terminal apparatuses, the probability of collision with other vehicles can be reduced. Also, if the transmission node type indicates an on-vehicle terminal apparatus, the receiving processing for the remaining part of the packet signal will be stopped. Thus the power consumption can be reduced. If the transmission node type indicates a mobile terminal apparatus, the receiving processing for the data payload will be continued and therefore the content of payload can be obtained.

If the transmission node type indicates an on-vehicle terminal apparatus, a group ID will be generated and the thus generated ID will be included in the packet signal and therefore a group can be formed anew. If the transmission node type indicates a mobile terminal apparatus, the number of members will be incremented and the thus incremented number thereof will be included in the packet signal and therefore the mobile terminal can participate in the group. If an ID identical to the group ID of packet signal that has already been broadcast is acquired, no packet signals will be broadcast and therefore the unnecessary broadcasting of packet signals can be minimized. Since the unnecessary broadcasting of packet signals is minimized, the increase in traffic volume can be suppressed. Since the unnecessary broadcasting of packet signals is minimized, the power consumption can be reduced. If no packet signals is received over a predetermined period of time after a packet signal is broadcast, a new group ID will be generated and the thus generated new group ID will be included in the packet signal. Thus, the group can be continued.

The present invention has been described based on the exemplary embodiments. The exemplary embodiments are intended to be illustrative only, and it is understood by those skilled in the art that various modifications to constituting elements and processes as well as arbitrary combinations thereof could be further developed and that such modifications and combinations are also within the scope of the present invention.

In the exemplary embodiment of the present invention, the data payload of packet signal generated by the generator 62 contains the positional information on its own mobile terminal apparatus 110 only. However, this should not be considered as limiting and, for example, the generator 62 may have the positional information on other mobile terminal apparatuses 110 belonging to the same group included in the data payload of packet signal. According to this modification, the on-vehicle terminal apparatus 14 that has received the packet signal can recognize the present location of a pedestrian.

In the exemplary embodiment of the present invention, the function of the RF unit 52 in the on-vehicle terminal apparatus 14 is similar to that of the RF unit 122 in the mobile terminal apparatus 110. However, this should not be considered as limiting and, for example, the parameters for the respective RF unit 122 may differ. The receiving sensitivity of the RF unit 122 may be lower than that of the RF unit 52. If the receiving dynamic range of the RF unit 52 is −0 dBm to −80 dBm, then the receiving dynamic range of the RF unit 122 may be −0 dBm to −20 dBm. According to this modification, the receiving dynamic range of the RF unit 52 is higher, thereby making it easier to detect the presence of a pedestrian. Since the receiving sensitivity of the RF unit 122 is low, the cost of the mobile terminal apparatus 110 can be reduced.

In the exemplary embodiment of the present invention, a group ID is used to form a group. However, this should not be considered as limiting and, for example, information on a base station apparatus 10 or an on-vehicle terminal apparatus 14 whose receiving strength is at maximum may be used in place of the group ID. According to this modification, the groups can be identified without use of group IDs.

In the exemplary embodiment of the present invention, the maximum number of members that can be included in a group is not defined. However, this should not be considered as limiting and, for example, the maximum number of members may be defined. This modification can prevent the size of a group from becoming unwieldily large.

A general description of one embodiment of the present invention is as follows. That is, a radio apparatus according to one embodiment of the present invention includes: a receiving unit for receiving a packet signal broadcasted from another radio apparatus; a broadcasting unit for broadcasting a packet signal; and a control unit for having the receiving unit perform an intermittent receiving processing and having the broadcasting unit stop broadcasting the packet signal, when no packet signals is received by the receiving unit over a predetermined period of time.

According to this embodiment, if no packet signals is received over a predetermined period of time, the intermittent receiving processing is carried out and, at the same time, the transmission of packet signals is stopped. Thus, the traffic volume can be reduced and the power consumption can be reduced.

When the packet signal is received while the receiving unit performs the intermittent receiving processing, the control unit has the receiving unit perform a continuous receiving processing and has the broadcasting unit start broadcasting the packet signal. According to this embodiment, the continuous receiving processing is carried out, so that the probability of failing to receive packet signals can be reduced. Since the transmission starts, the presence of other terminal apparatuses can be conveyed to the surrounding terminal apparatuses.

The packet signal received by the receiving unit may be constructed such that a header and a payload following the header are arranged, the header containing information on a status of use of the other radio apparatus that is a broadcasting source; when the receiving unit receives the packet signal, while the receiving unit performs the intermittent receiving processing, and when the information contained in the header indicates that the other radio apparatus is mounted on a vehicle, the receiving unit may stop receiving a remaining part of the packet signal. According to this embodiment, the receiving processing for the remaining part of the packet signal is stopped, so that the power consumption can be reduced.

When the receiving unit receives the packet signal, while the receiving unit performs the intermittent receiving processing, and when the information contained in the header indicates that the other radio apparatus is not mounted on a vehicle, the receiving unit may continue receiving the remaining part of the packet signal. According to this embodiment, the receiving processing for the data payload is continued, so that the content of payload can be obtained.

The control unit may include: a first processing unit for having the broadcasting unit broadcast a packet signal where a group ID and an initial value of the number of members are contained in a payload, when the receiving unit receives the packet signal while the receiving unit performs the intermittent receiving processing, and when the information contained in the header indicates that the other radio apparatus is mounted on a vehicle; a second processing unit for extracting information regarding the group ID and the number of members contained in a payload of a packet signal and having the broadcasting unit broadcast a packet signal that contains information regarding the group ID and the incremented number of members contained in the payload of the packet signal, when the receiving unit receives the packet signal, while the receiving unit performs the intermittent receiving processing, and when the information contained in the header indicates that the other radio apparatus is not mounted on a vehicle; and a third processing unit for having the broadcasting unit stop broadcasting the packet signal, when the receiving unit receives the packet signal after the first processing unit or the second processing unit has broadcast the packet signal and when a group ID contained in the payload of the packet signal is identical to the group ID contained in the payload of the packet signal that has already been broadcasted. According to this embodiment, if the transmission node type indicates an on-vehicle terminal apparatus, a group ID will be generated and the thus generated ID will be included in the packet signal and therefore a group can be formed anew. If the transmission node type indicates a mobile terminal apparatus, the number of members will be incremented and the thus incremented number thereof will be included in the packet signal and therefore the mobile terminal can participate in the group.

The control unit may further include a fourth processing unit for having broadcast a packet signal that contains, in the payload, a new group ID different from the group ID contained in the payload of the packet signal that has already been broadcast, the initial value of the member number, the group ID contained in the payload of the packet signal that has already been broadcast, and information on a most recent member number for the group ID contained in the payload of the packet signal that has already been broadcast, when no packet signals is received by the receiving unit for the predetermined period of time after the first processing unit or the second processing unit has broadcast the packet signal. According to this embodiment, if no packet signals is received over the predetermined period of time after a packet signal is broadcast, a new group ID will be generated and the thus generated new group ID will be included in the packet signal. Thus, the group can be continued.

The control unit may have positional information on a radio apparatus belonging to a group further contained in the payload of a packet signal broadcast by the broadcasting unit. According to this embodiment, the present location of a pedestrian can be recognized.

When the packet signal is received while the receiving unit performs the intermittent receiving processing, the control unit may shorten intervals at which the receiving unit receives the packet signal and has the broadcasting unit start broadcasting the packet signal.

What is claimed is:

1. A radio apparatus comprising: a receiving unit configured to receive a packet signal broadcasted from another radio apparatus;
a broadcasting unit configured to broadcast a packet signal; and
a control unit configured to have the receiving unit perform an intermittent receiving processing and configured to have the broadcasting unit stop broadcasting the packet signal, when no packet signal is received by the receiving unit over a predetermined period of time, wherein
when the packet signal is received while the receiving unit performs the intermittent receiving processing, the control unit has the receiving unit perform a continuous receiving processing and has the broadcasting unit start broadcasting the packet signal,
the packet signal received by the receiving unit is constructed such that a header and a payload following the header are arranged, the header containing information on a status of use of the other radio apparatus that is a broadcasting source, and
when the receiving unit receives the packet signal, while the receiving unit performs the intermittent receiving processing, and when the information contained in the header indicates that the other radio apparatus is mounted on a vehicle, the receiving unit stops receiving a remaining part of the packet signal.

2. A radio apparatus according to claim 1, wherein, when the receiving unit receives the packet signal, while the receiving unit performs the intermittent receiving processing, and when the information contained in the header indicates that the other radio apparatus is not mounted on a vehicle, the receiving unit continues receiving the remaining part of the packet signal.

3. A radio apparatus according to claim 2, the control unit including:
a first processing unit configured to have the broadcasting unit broadcast a packet signal where a group ID and an initial value of the number of members are contained in a payload, when the receiving unit receives the packet signal while the receiving unit performs the intermittent receiving processing, and when the information contained in the header indicates that the other radio apparatus is mounted on a vehicle;
a second processing unit configured to extract information regarding the group ID and the number of members contained in a payload of a packet signal and configured to have the broadcasting unit broadcast a packet signal that contains information regarding the group ID and the incremented number of members contained in the payload of the packet signal, when the receiving unit receives the packet signal, while the receiving unit performs the intermittent receiving processing, and when the information contained in the header indicates that the other radio apparatus is not mounted on a vehicle; and
a third processing unit configured to have the broadcasting unit stop broadcasting the packet signal, when the receiving unit receives the packet signal after the first processing unit or the second processing unit has broadcast the packet signal and when a group ID contained in the payload of the packet signal is identical to the group ID contained in the payload of the packet signal that has already been broadcasted.

4. A radio apparatus according to claim 3, the control unit further including a fourth processing unit configured to have the broadcasting unit broadcast a packet signal that contains, in the payload, a new group ID different from the group ID contained in the payload of the packet signal that has already been broadcast, the initial value of the number of members, the group ID contained in the payload of the packet signal that has already been broadcast, and information on a most recent number of members for the group ID contained in the payload of the packet signal that has already been broadcast, when no packet signals is received by the receiving unit for the predetermined period of time after the first processing unit or the second processing unit has broadcast the packet signal.

5. A radio apparatus according to claim 3, wherein the control unit has positional information, on a radio apparatus belonging to a group, further contained in the payload of a packet signal broadcast by the broadcasting unit.

6. A radio apparatus comprising:
a receiving unit configured to receive a packet signal broadcasted from another radio apparatus;
a broadcasting unit configured to broadcast a packet signal; and
a control unit configured to have the receiving unit perform an intermittent receiving processing and configured to have the broadcasting unit stop broadcasting the packet signal, when no packet signal is received by the receiving unit over a predetermined period of time,
wherein the packet signal received by the receiving unit is constructed such that a header and a payload following the header are arranged, the header containing information on a status of use of the other radio apparatus that is a broadcasting source,
the control unit including:
a first processing unit configured to have the broadcasting unit broadcast a packet signal where a group ID and an initial value of the number of members are contained in a payload, when the receiving unit receives the packet signal while the receiving unit performs the intermittent receiving processing, and when the information contained in the header indicates that the other radio apparatus is mounted on a vehicle;
a second processing unit configured to extract information regarding the group ID and the number of members contained in a payload of a packet signal and configured to have the broadcasting unit broadcast a packet signal that contains information regarding the group ID and the incremented number of members contained in the payload of the packet signal, when the receiving unit receives the packet signal, while the receiving unit performs the intermittent receiving processing, and when the information contained in the header indicates that the other radio apparatus is not mounted on a vehicle; and
a third processing unit configured to have the broadcasting unit stop broadcasting the packet signal, when the receiving unit receives the packet signal after the first processing unit or the second processing unit has broadcast the packet signal and when a group ID contained in the payload of the packet signal is identical to the group ID contained in the payload of the packet signal that has already been broadcasted.

7. A radio apparatus according to claim 6, the control unit further including a fourth processing unit configured to have the broadcasting unit broadcast a packet signal that contains, in the payload, a new group ID different from the group ID contained in the payload of the packet signal that has already been broadcast, the initial value of the number of members, the group ID contained in the payload of the packet signal that has already been broadcast, and information on a most recent number of members for the group ID contained in the payload of the packet signal that has already been broadcast, when no packet signal is received by the receiving unit for the predetermined period of time after the first processing unit or the second processing unit has broadcast the packet signal.

8. A radio apparatus according to claim 7, wherein the control unit has positional information, on a radio apparatus belonging to a group, further contained in the payload of a packet signal broadcast by the broadcasting unit.

* * * * *